(12) United States Patent
Nishioka

(10) Patent No.: US 6,776,640 B2
(45) Date of Patent: Aug. 17, 2004

(54) CARD CONNECTOR APPARATUS WITH LOCKING MECHANISM FOR LOCKING A CARD TO MOUNTING POSITION

(75) Inventor: Toru Nishioka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/407,058

(22) Filed: Apr. 2, 2003

(65) Prior Publication Data

US 2003/0194897 A1 Oct. 16, 2003

(30) Foreign Application Priority Data

Apr. 15, 2002 (JP) ....................................... 2002-112501

(51) Int. Cl.[7] .............................................. H01R 13/62
(52) U.S. Cl. ........................ 439/325; 439/630; 439/159
(58) Field of Search ................................. 429/325, 159, 429/160, 630, 328; 361/754

(56) References Cited

U.S. PATENT DOCUMENTS

| | | | | |
|---|---|---|---|---|
| 6,234,821 B1 | * | 5/2001 | Tan ............................ | 439/328 |
| 6,267,614 B1 | * | 7/2001 | Good et al. ................. | 439/327 |
| 6,270,365 B1 | * | 8/2001 | Nishioka .................... | 439/159 |
| 6,319,029 B2 | * | 11/2001 | Nishioka .................... | 439/159 |
| 6,332,790 B1 | * | 12/2001 | Ishikawa et al. ............ | 439/157 |
| 6,361,338 B1 | | 3/2002 | Chang | |
| 6,394,827 B2 | * | 5/2002 | Nogami ...................... | 439/159 |
| 6,398,567 B1 | * | 6/2002 | Nishimura .................. | 439/159 |
| 6,478,591 B1 | * | 11/2002 | Chang ........................ | 439/159 |
| 6,478,595 B2 | * | 11/2002 | Nishioka .................... | 439/188 |
| 6,482,020 B1 | * | 11/2002 | Yeh ............................ | 439/159 |
| 6,520,783 B2 | * | 2/2003 | Hsu ........................... | 439/157 |
| 6,537,090 B2 | * | 3/2003 | Ozawa ....................... | 439/159 |
| 6,585,542 B2 | * | 7/2003 | Nishio et al. ............... | 439/630 |
| 6,587,348 B2 | * | 7/2003 | Kondo ........................ | 361/741 |
| 6,619,991 B2 | * | 9/2003 | Nishio et al. ............... | 439/630 |

* cited by examiner

*Primary Examiner*—Ross Gushi
(74) *Attorney, Agent, or Firm*—Beyer Weaver & Thomas

(57) ABSTRACT

A card connector apparatus that can prevent forced removal of a card at a predetermined mounting position and transmission of a force exerted when trying to pull the card out by force to a locking mechanism is provided. An apparatus of the present invention includes a slider, an ejection spring, a locking mechanism for the slider including a heart-shaped cam groove and a latch-pin, an engaging member, that is, a leaf spring, provided on the slider, and a fixed portion, for example, a shoulder, with which an end portion of the leaf spring engages when a compact memory card is in a state of being held at a predetermined mounting position, and an attempt is made to move the compact memory card in the ejecting direction, that is, toward the insertion port, the shoulder being formed on a housing.

12 Claims, 13 Drawing Sheets

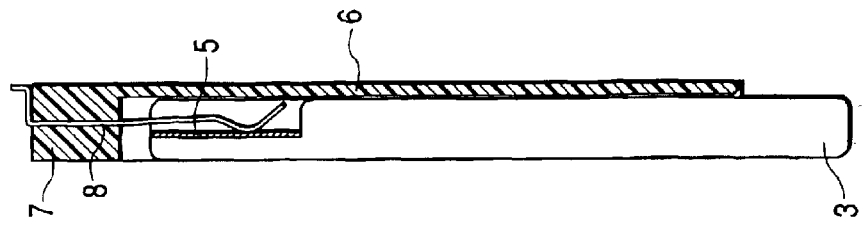
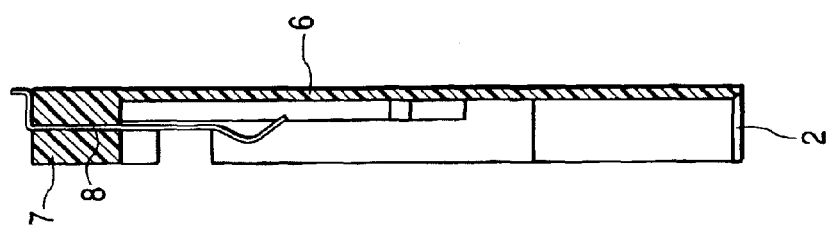
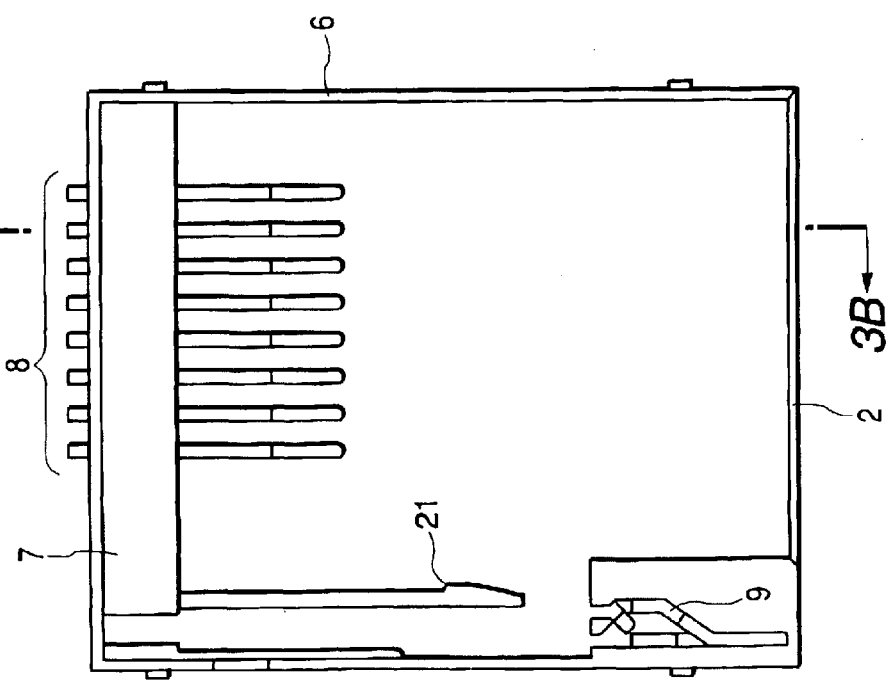

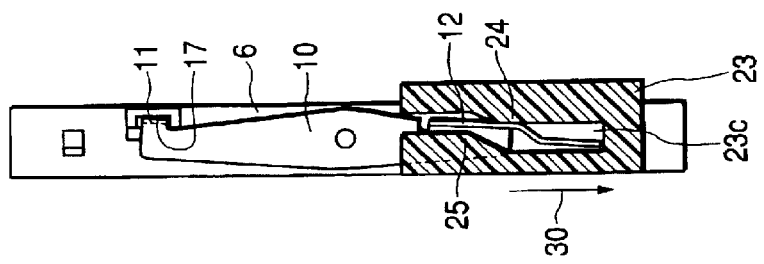
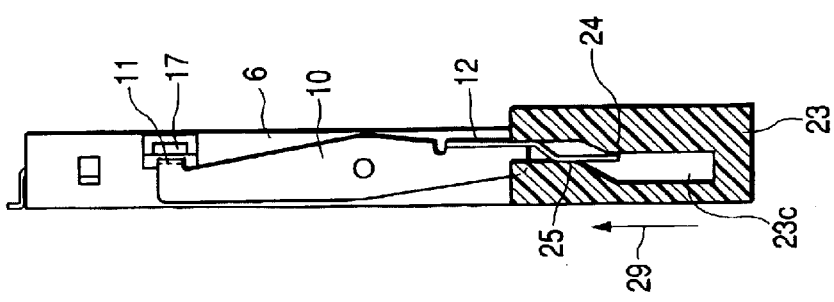
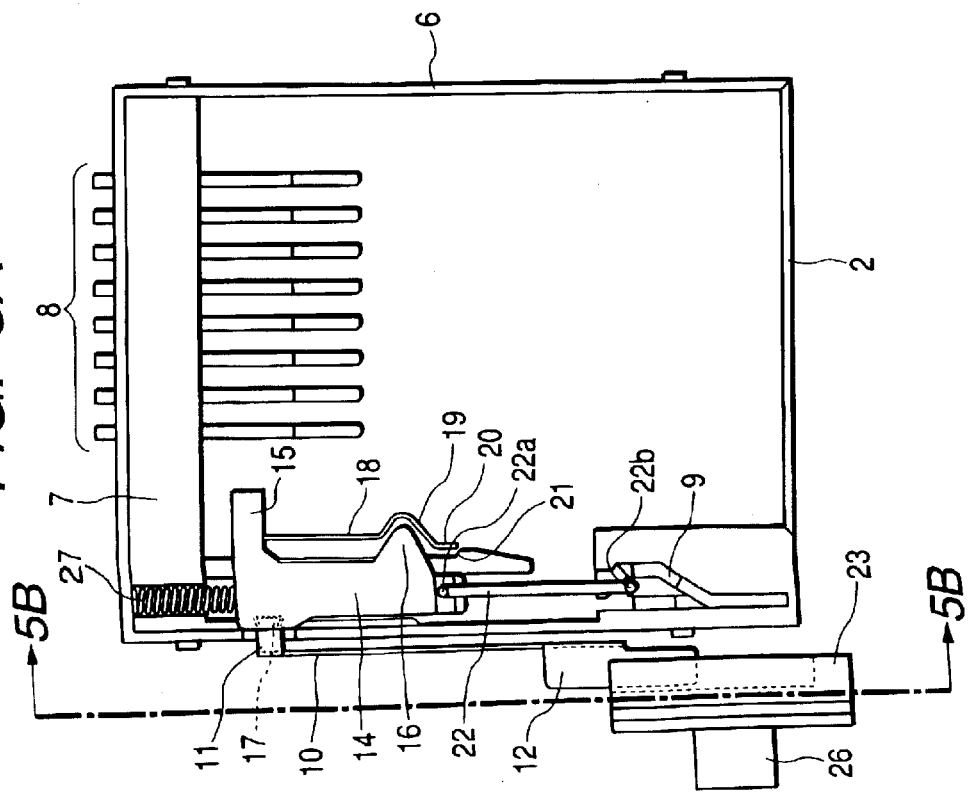

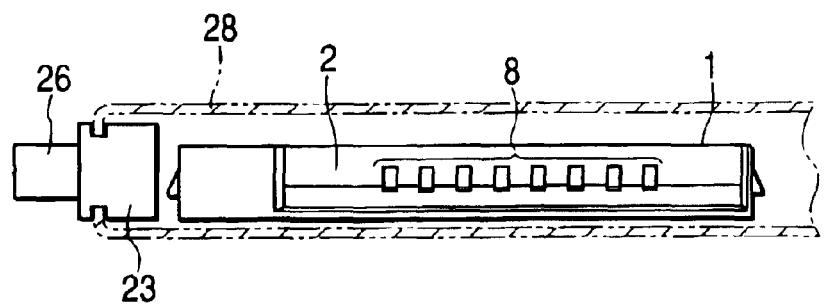
FIG. 6
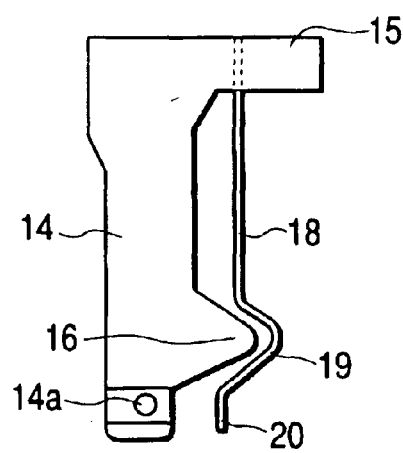
FIG. 7A
FIG. 7B
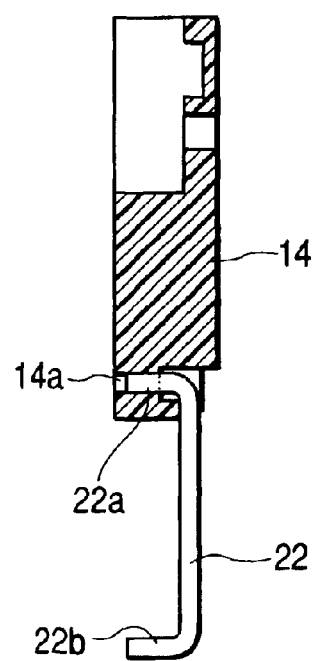
FIG. 8

CARD CONNECTOR APPARATUS WITH LOCKING MECHANISM FOR LOCKING A CARD TO MOUNTING POSITION

BACKGROUND OF THE INVENTION

1. Field of the Invention

The present invention relates to a card connector apparatus having a locking mechanism for locking a slider for transporting a compact memory card or the like, that is, an information card, to a predetermined card mounting position.

2. Description of Related Art

In the related art, a card connector apparatus of this type includes a slider movable in a direction of travel of a compact memory card, an ejection spring for urging the slider in a direction of ejection of the compact memory card, and a locking mechanism for locking the slider at a predetermined card mounting position against an urging force of the ejection spring. The locking mechanism includes, for example, a heart shaped cam groove formed on a housing, a latch-pin, which is a locking member provided on the slider and is capable of sliding along the heart-shaped cam groove, and the like.

Such a structure may include a recess formed at a side edge of the compact memory card and a resilient strip formed projectingly on the slider portion, which is capable of opposing the recess. When the compact memory card is inserted through an insertion port, the resilient strip on the slider engages the recess on the compact memory card, thereby holding the compact memory card on the slider.

In order to enable insertion and removal of the compact memory card at the insertion port by manual operation, there is provided the above-described resilient strip, which may easily be engaged with and released from the recess on the side edge on the compact memory card in association with insertion and ejection of the compact memory card.

In the related art described above, since the compact memory card is held at the predetermined card mounting position via the resilient strip, which may be bent to a certain degree, when the compact memory card projecting from the insertion port is pulled by force, the resilient strip may be bent and thus the compact memory card may be forcedly removed.

In order to cope with such an anxiety, it is conceivable to provide a stiff projection on the slider and allow the projection to engage the recess on the compact memory card, so that the stiff projection can prevent movement of the compact memory card when an attempt is made to remove the compact memory card by force.

However, in such an arrangement, when an attempt is made to pull out the compact memory card by a strong force, the strong force is transmitted to the slider via the projection and hence to the locking mechanism. As a consequence, the locking mechanism may be broken or become damaged. For example, if the locking mechanism includes a heart-shaped cam groove and a latch-pin as described above, the latch-pin may be broken or the locked portion of the heart-shaped cam groove, to which the latch-pin is locked, may become damaged.

SUMMARY OF THE INVENTION

In view of the circumstances in the related art, it is an object of the present invention to provide a card connector apparatus in which the card placed at the predetermined mounting position may be prevented from being removed by force, and a force exerted when trying to pull the card out by force may be prevented from being transmitted to the locking mechanism.

In order to achieve the object, the present invention provides a construction including a slider that is movable in a direction of travel of a card, an ejection spring for urging the slider in a direction of ejection of the card, a locking mechanism that locks the slider to a predetermined card mounting position against an urging force of the ejection spring, an engaging member formed on the slider for engaging the card so as to hold the card at the predetermined card mounting position, a fixed portion with which the engaging member engages after being displaced when an attempt is made to move the card in the direction of ejection in a state in which the card is held at the predetermined card mounting position by the engaging member, and the fixed portion being provided on a member other than the slider.

According to the present invention in this arrangement, when an attempt is made to pull out the card by force in a state in which the card is held at the predetermined card mounting position, the engaging member on the slider engages the fixed portion by a pulling force that moves the card in the direction of ejection. Such engagement between the engaging member and the fixed portion may prevent movement of the card in the direction of ejection, that is, forced removal. A force exerted when trying to pull the card out by force in this case is mainly transmitted to the fixed portion provided on the member other than the slider via the engaging member. Therefore, the force may be prevented from being transmitted from the engaging member through the slider to the locking mechanism.

The invention described above may have a construction in which the above-described locking mechanism is provided on the heart-shaped cam groove and on the slider, and a locking member that is slidable along the heart-shaped cam groove is provided.

In this arrangement, a locking mechanism and an unlocking performance of the locking mechanism that are relatively simple in structure and stable may be secured.

In the invention, a construction in which the engaging member includes a leaf spring having a projection that is fitted into a recess formed at a side edge of the card is also applicable.

In this arrangement, when an attempt is made to remove the card by force, the leaf spring engages the fixed portion while being bent. As a consequent, prevention of forced removal and constraint of transmission of a pulling force to the locking mechanism via the slider may be achieved.

In the invention, the basic configuration of the projection may be a triangular shape.

In this arrangement, when an attempt is made to pull out the card when the card is held at the predetermined mounting position, the portion positioned backside of the triangular projection is bent by a pressure exerted by the card, and the leaf spring having the projection reliably engages the fixed portion, which contributes to prevention of forced removal of the card and constraint of transmission of the force to pull out the card by force to the locking mechanism.

In the invention described above, an abutting portion that can abut against the projection of the leaf spring when the leaf spring engages the fixed portion may be provided, and the configuration of the abutting portion may be formed into a shape corresponding to the triangular shape of the projection.

In this construction, when the leaf spring engages the fixed portion, the abutting portion abuts against the projection of the leaf spring, and the abutting portion can prevent resilient deformation of the projection of the leaf spring more than necessary. In other words, the portion including the leaf spring and the abutting portion works as a structure having stiffness at the timing when the leaf spring engages the fixed portion, and thus movement of the card in the direction of ejection may be perfectly prevented.

In the invention described above, a construction in which the abutting portion is provided on the slider may be applied.

In this arrangement, the abutting portion to be abutted against the projection of the leaf spring may be formed simultaneously when manufacturing the slider.

In the invention, a construction in which a unit for supporting the slider so as to be capable of swinging motion in a state in which the card is ejected may be applied.

In this arrangement, constraint of movement of the card by the projection of the leaf spring provided on the slider is released by a swinging motion of the slider at the ejected position and thus ordinary operation of pulling out the card may be performed smoothly.

In the invention, a construction in which the fixed portion is provided on a housing that holds a terminal member with which a contact portion of the card comes into contact may be applied.

In this arrangement, the fixed portion with which the engaging member provided on the slider can engage may be manufactured simultaneously with fabrication of the housing including the terminal member.

In the invention described above, a construction in which the fixed portion is formed on a cover that covers the slider may be applied.

In this arrangement, the fixed portion may be manufactured simultaneously when manufacturing the cover.

BRIEF DESCRIPTION OF THE DRAWINGS

FIG. 2 is a drawing showing a compact memory card to be inserted into and ejected from the apparatus according to the embodiment of the present invention, in which

FIG. 3 shows a housing provided in the apparatus according to the embodiment of the present invention shown in FIG. 1, in which FIG. 3A is a plan view, FIG. 3B is a cross-sectional view taken along the line B-B in FIG. 3A, and FIG. 3C is a cross-sectional view showing a state in which the compact memory card shown in FIG. 2 is held in a predetermined mounting position;

FIG. 4 is a drawing showing a relation between an engaging member that constrains movement of a slider provided in the present embodiment shown in FIG. 1 and the cover on which the engaging member is attached.

FIG. 5 is a drawing showing relations among the slider provided on the apparatus of the present embodiment shown in FIG. 1, the engaging member that constrains movement of the slider, and the operating member for operating the engaging member, in which FIG. 5A is a plan view, FIG. 5B is a cross-sectional view taken along the line B—B in FIG. 5A, and FIG. 5C is a cross-sectional, view showing a state in which the engaging member is engaged with the slider;

FIG. 6 is a front view showing a state in which the apparatus of the embodiment shown in FIG. 1 is attached to an enclosure of electronic equipment;

FIG. 7 is a drawing showing the slider shown in FIG. 5 and the engaging member, that is, a leaf spring provided on the slider, in which FIG. 7A is a plan view, and FIG. 7B is a front view;

FIG. 8 is a cross-sectional side view showing a connection between the slider shown in FIG. 5 and a locking member that is engaged with the slider and is slidable along the heart-shaped cam groove, that is, a latch-pin;

DESCRIPTION OF THE PREFERRED EMBODIMENTS

Referring now to attached drawings, an embodiment of a card connector apparatus according to the present invention will be described.

FIGS. 1 to 15 are drawings showing an embodiment of the card connector apparatus according to the present invention.

Figure 1:
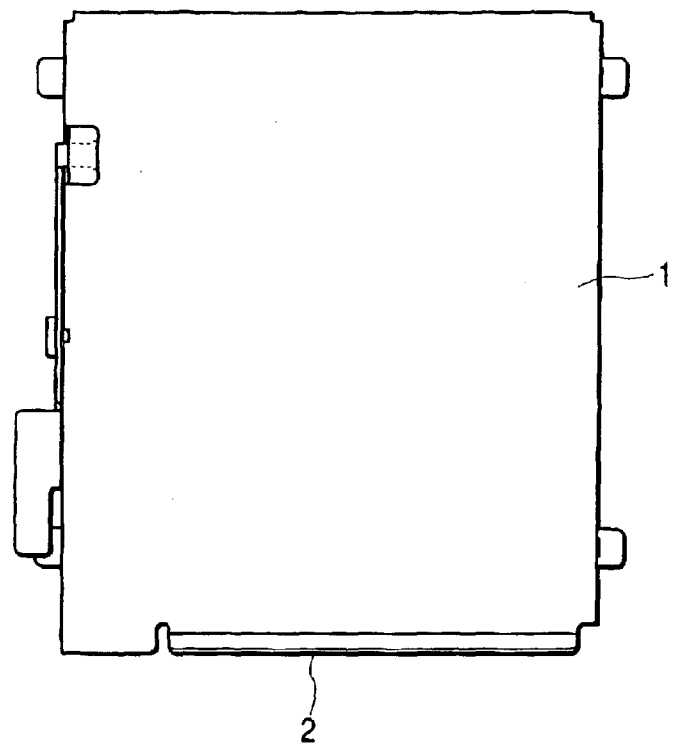
FIG. 1 is a plan view showing an appearance of a principal portion of a card connector apparatus according to an embodiment of the present invention.
Figure 2A:
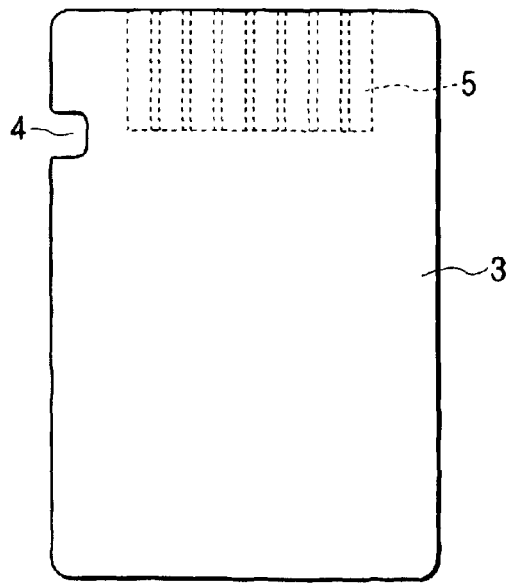
FIG. 2A is a plan view.
Figure 2B:
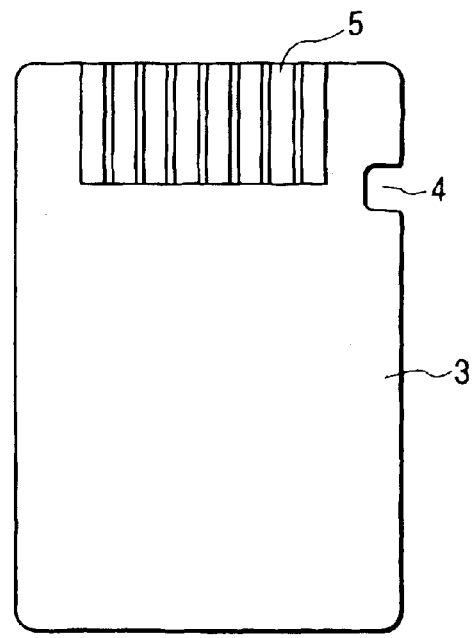
FIG. 2B is a back view.

FIG. 1 is a plan view showing an appearance of a principal portion of an embodiment of the present invention. FIG. 2 shows a compact memory card that is inserted into and ejected from the embodiment of FIG. 1, in which FIG. 2A is a plan view, and FIG. 2B is a back view.

The present embodiment is provided at the distal end thereof with a cover 1 that covers a housing 6, which will be described later, as shown in FIG. 1. The bottom portion of the apparatus of FIG. 1, which is located on the nearer side of the user, is an insertion port 2. A compact memory card 3, which is an information card shown in FIG. 2, is inserted into and ejected from the insertion port 2. The compact memory card 3 includes a contact portion 5 that comes into contact with a terminal member 8 of a connector 7 that will be described later, and a recess 4 for engagement with a slider 14 that will be described later on one side edge thereof.

FIG. 3 shows the housing 6 provided in the apparatus according to the present embodiment shown in FIG. 1, in which FIG. 3A is a plan view, FIG. 3B is a cross-sectional view taken along the line B—B in FIG. 3A, and FIG. 3C is a cross-sectional view showing a state in which the compact memory card 3 shown in FIG. 2 is held in the predetermined mounting position.

The housing 6 constituting a main body of the apparatus of the present embodiment includes the connector 7 having the terminal member 8 on the backside thereof with respect to the insertion port 2 as shown in FIG. 3. The housing 6 also includes a heart-shaped cam groove 9 constituting the locking mechanism on one of the side portions thereof. In a state in which the compact memory card 3 inserted through the insertion port 2 is held in the predetermined card mounting position, the contact portion 5 of the compact memory card 3 and the terminal member 5 of the connector 7 are brought into contact with each other, as shown in FIG. 3C.

Figure 4A:
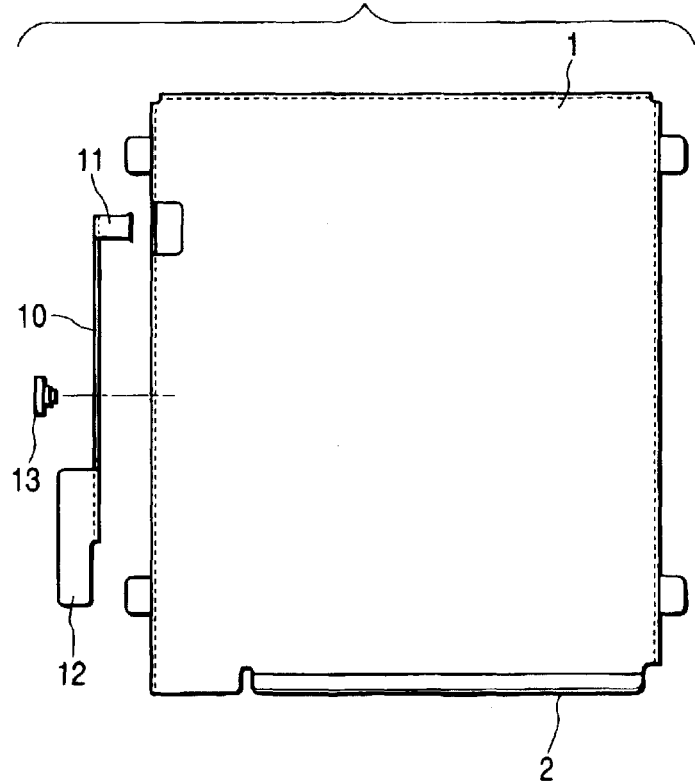
FIG. 4A is a plan view showing a state in which the engaging member is removed from the cover.
Figure 4B:
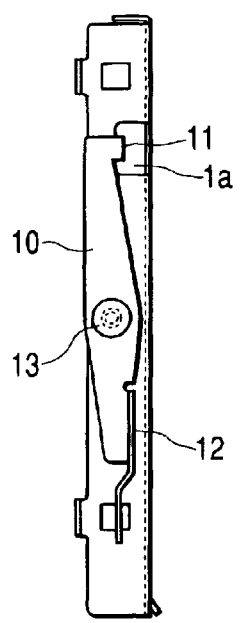
FIG. 4B is a side view showing a state in which the engaging member is attached to the cover.

FIG. 4 is a drawing showing a relation between an engaging member 10 that constrains movement of the slider 14, which will be described later, provided in the present embodiment shown in FIG. 1 and the cover 1 on which the engaging member 10 is attached. FIG. 4A is a plan view showing a state in which the engaging member 10 is removed from the cover 1, FIG. 4B is a side view showing a state in which the engaging member 10 is attached to the cover 1.

The engaging member 10 is held on the side surface of the cover 1 with a machine screw 13 so as to be capable of swinging about the machine screw 13, and the machine screw 13 serves as a fulcrum of swinging motion thereof. The engaging member 10 includes a projection 11 that engages the later-described slider 14 on one side thereof, and a mounting portion 12 for a later described mounting member 23 on the other side thereof with respect to the machine screw 13. The shape of the mounting portion 12 includes, as shown in FIG. 4B, when viewed from the side, linear portions that are parallel to each other, and an inclined portion connecting these linear portions. The side edge of the cover 1 is provided with a hole 1a, through which the projection 11 of the engaging member 10 can be inserted.

Figure 9:
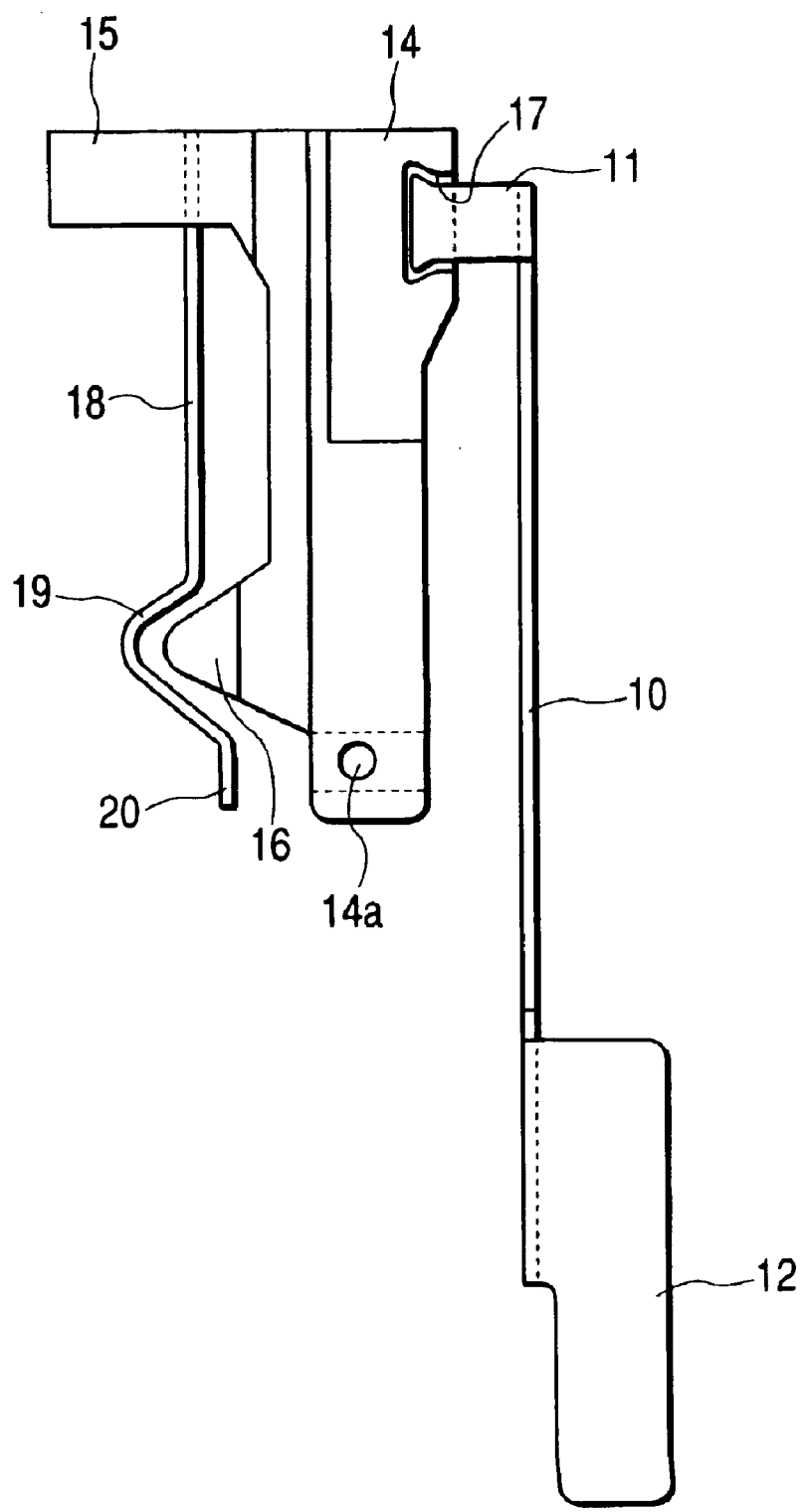
FIG. 9 is a back view showing a state in which the engaging member shown in FIG. 5 is engaged with the slider.

FIG. 5 is a drawing showing relations among the slider 14 provided on the apparatus of the present embodiment shown in FIG. 1, the engaging member 10 that constrains movement of the slider 14, and the control member 23 for controlling the engaging member 10. FIG. 5A is a plan view, FIG. 5B is a cross sectional view taken along the line B—B in FIG. 5A, and FIG. 5C is a cross-sectional view showing a state in which the engaging member 10 is engaged with the slider 14. FIG. 6 is a front view showing a state in which the apparatus of the present invention shown in FIG. 1 is attached to an enclosure 28 of electronic equipment. FIG. 7 is a drawing showing the slider 14 shown in FIG. 5 and the engaging member, that is, a leaf spring 18 provided on the slider 14. FIG. 5A is a plan view, and FIG. 5B is a front view. FIG. 8 is a cross-sectional side view showing a connection between the slider 14 shown in FIG. 5 and a locking member that is engaged with the slider 14 and is slidable along the heart-shaped cam groove 9, that is, a latch-pin 22. FIG. 9 is a back view showing a state in which the engaging member 10 shown in FIG. 5 is engaged with the slider 14.

The slider 14 is movable in a direction of insertion of the compact memory card 3. In other words, the slider 14 includes an overhanging portion 15, which the distal end of the compact memory card 3 inserted through the insertion port 2 can engage, as shown in FIG. 5A, and FIGS. 7A and 7B. The slider 14 also includes a recess 17 that can accommodate the projection 11 of the engaging member 10 described above as shown in FIGS. 5B and 5C and FIG. 9. As shown in FIG. 5C, the engaging member 10 engages the slider 14 when the projection 11 of the engaging member 10 is accommodated in the recess 17 of the slider 14. As shown in FIG. 5B, engagement between the engaging member 10 and the slider 14 is released when the projection 11 of the engaging member 10 gets away from the recess 17.

The slider 14 includes an engaging member that can engage the recess 4 of the compact memory card 3 inserted through the insertion port 2, that is, the leaf spring 18 integrally formed therewith as shown in FIG. 5A and FIGS. 7A and 7B. The leaf spring 18 includes a projection 19, which has basically a triangle shape for example, and can be fitted into the recess 4 on the compact memory card 3. The slider 14 includes an abutting portion 16 that can abut against the projecting portion 19 of the leaf spring 18.

The operating member 23 that is mounted to the mounting portion 12 of the engaging member 10 for constraining movement of the slider 14 is formed with an elongated hole 23c in which the mounting portion 12 of the engaging member 10 is accommodated, as shown in FIGS. 5B and 5C. The operating member 23 may be operated to allow the engaging member 10 to engage the slider 14 as shown in FIG. 5C, and to allow the engaging member 10 to get away from the slider 14 as shown in FIG. 5B.

For example, the operating member 23 is set to be movable between a position at which the projection 11 of the engaging member 10 engages the recess 17 of the slider 14, that is, a predetermined first position shown in FIG. 5C, and a position at which the projection 11 is moved away from the recess 17, that is, a predetermined second position shown in FIG. 5B.

The operating member 23 includes a first pressing portion 24 that exerts a pressing force to bring the projection 11 of the engaging member 10 into engagement with the recess 17 of the slider 14 to the engaging member 10 when the operating member 23 is at the first position shown in FIG. 5C. The operating member 23 also includes a second pressing portion 25 that exerts a pressing force to bring the projection 11 out of engagement with the recess 17 to the engaging member 10 when the operating member 23 is at the second position shown in FIG. 5B.

As shown in FIG. 5A and FIG. 6, the operating member 23 includes an integrally formed tab 26. The operating member 23 is, as shown in FIG. 6, movably attached on the side surface or the like of the enclosure 28 of electronic equipment.

The slider 14 includes a hole 14a at the position opposite from the overhanging portion 15 shown in FIG. 5A and FIG. 8. A locking member that constitutes the locking mechanism, that is, a first pin portion 22a of the latch-pin 22 is inserted into the hole 14a. A second pin portion 22b of the latch-pin 22 is capable of sliding movement along the heart-shaped cam groove 9 that constitutes the locking mechanism.

The shape of the heart-shaped cam groove 9 is determined so that the locking mechanism can be unlocked by pressing and moving the compact memory card 3 further toward the inside in a state in which the compact memory card 3 is held at the predetermined mounting position.

As shown in FIG. 5A, the housing 6 includes a fixed portion, that is, a shoulder 21, with which an end portion 20 of the leaf spring 18, that serves as an engaging member, engages when an attempt is made to move the compact memory card 3 toward the insertion port 2, that is, in the direction of ejection in a state in which the compact memory card 3 is held at the predetermined card mounting position.

FIG. 10 to FIG. 15 are drawings showing actions of the apparatus when the compact memory card 3 is inserted.

Figure 10:
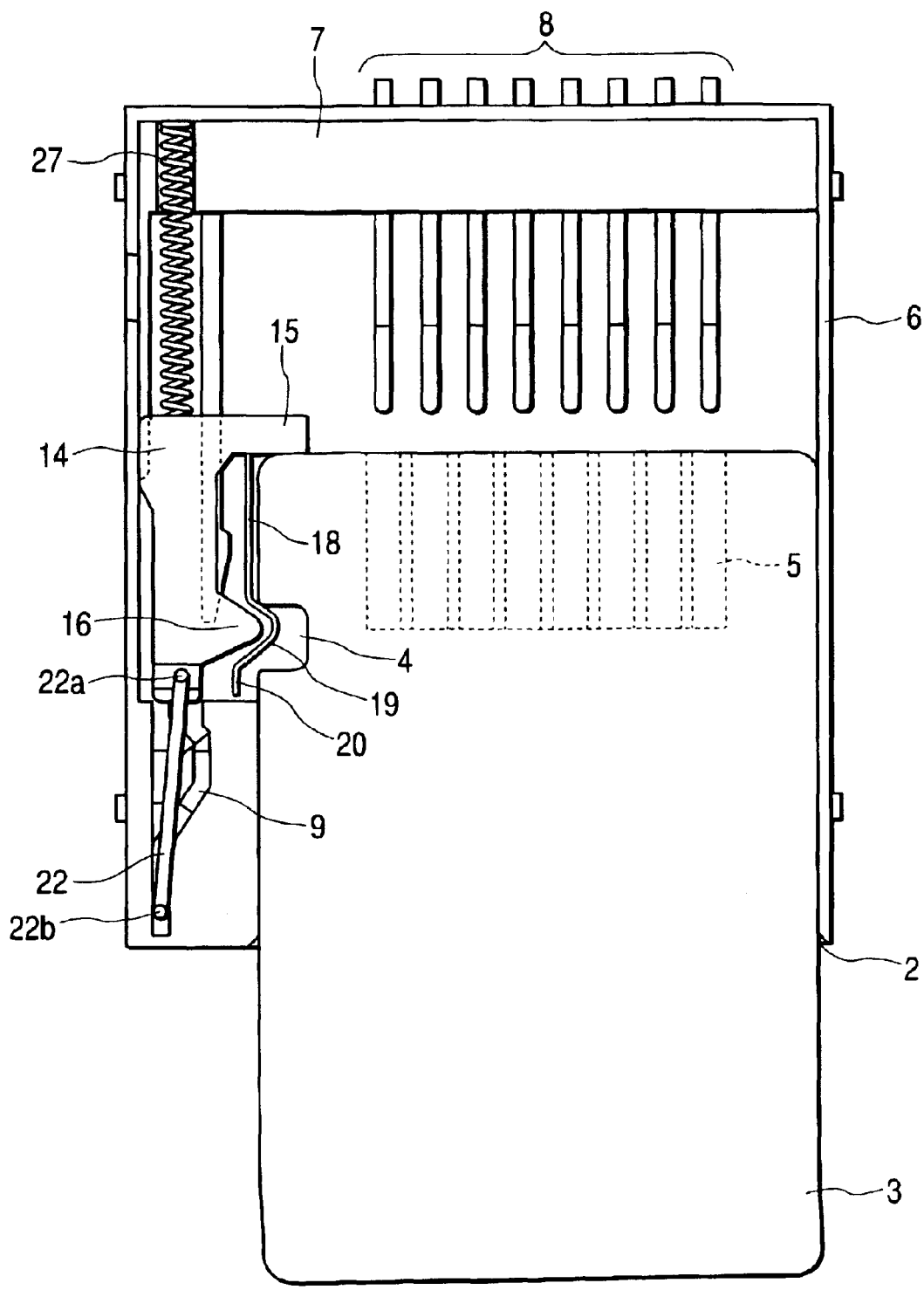
FIG. 10 is a plan view showing a state of the compact memory card shown in FIG. 2 in a state of being inserted.
Figure 11:
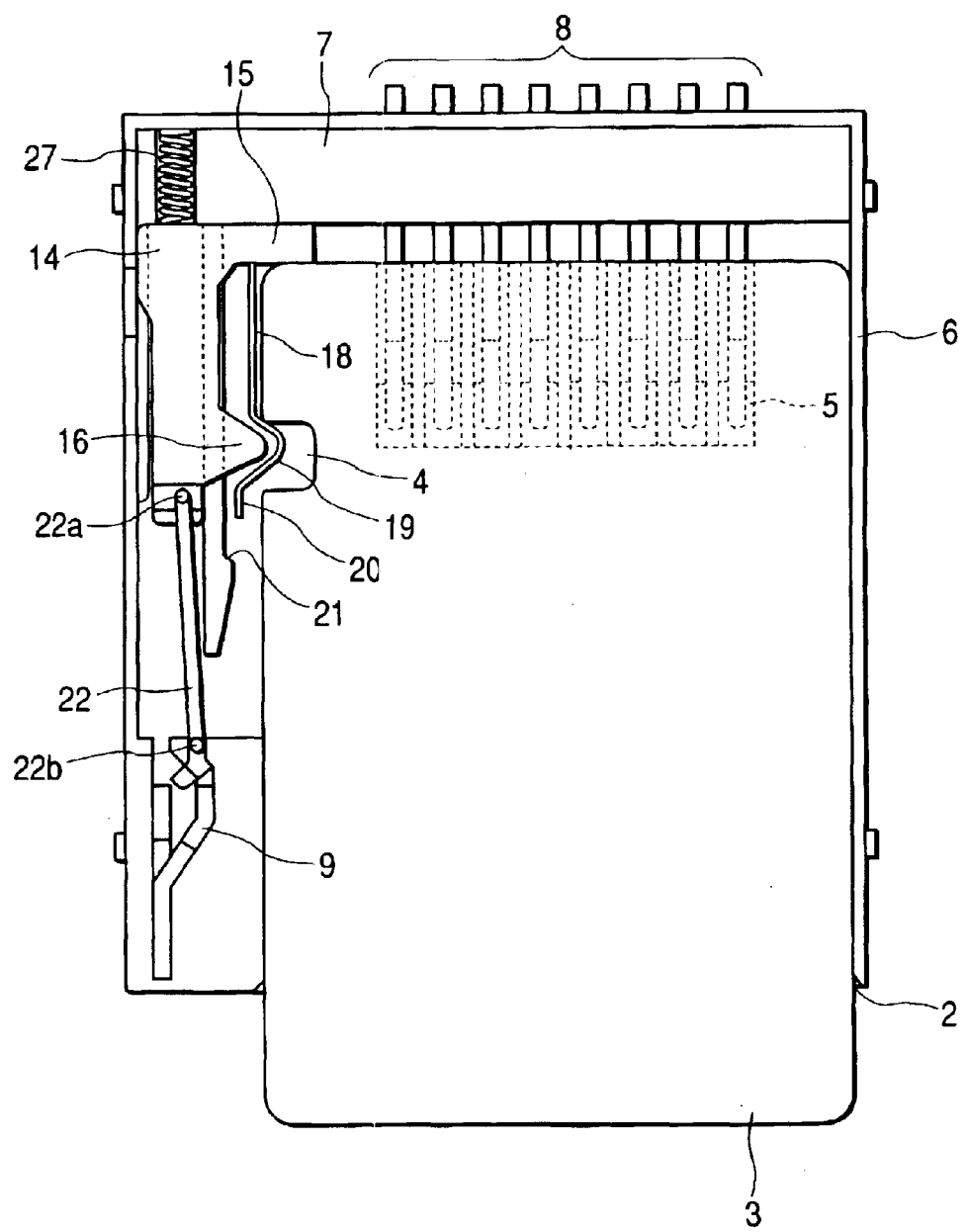
FIG. 11 is a plan view showing the compact memory card shown in FIG. 2 in an over-stroke state before the compact memory card is held at the predetermined card mounting position.
Figure 12:
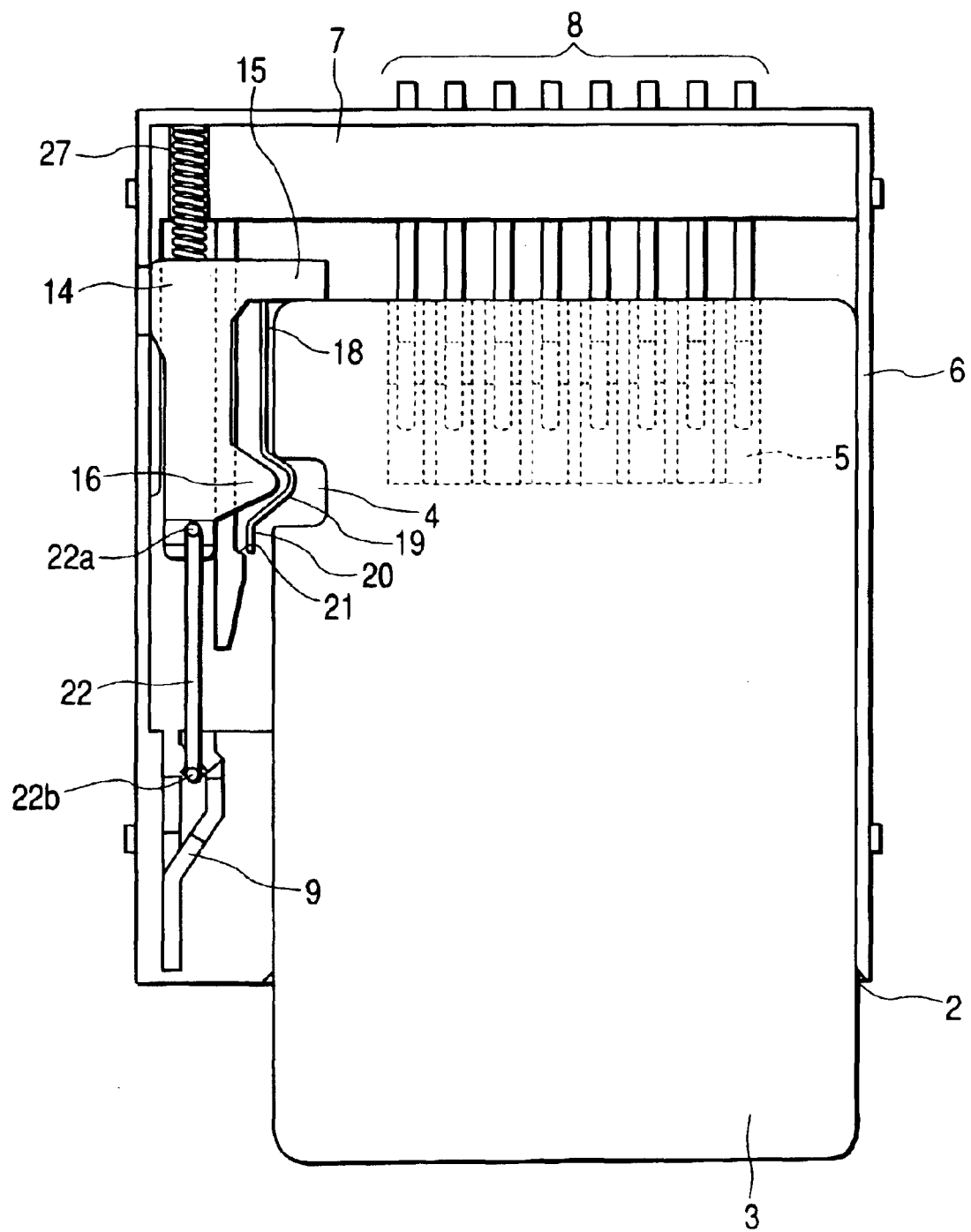
FIG. 12 is a plan view showing a state in which the compact memory card shown in FIG. 2 is held at the predetermined card mounting position.
Figure 13:
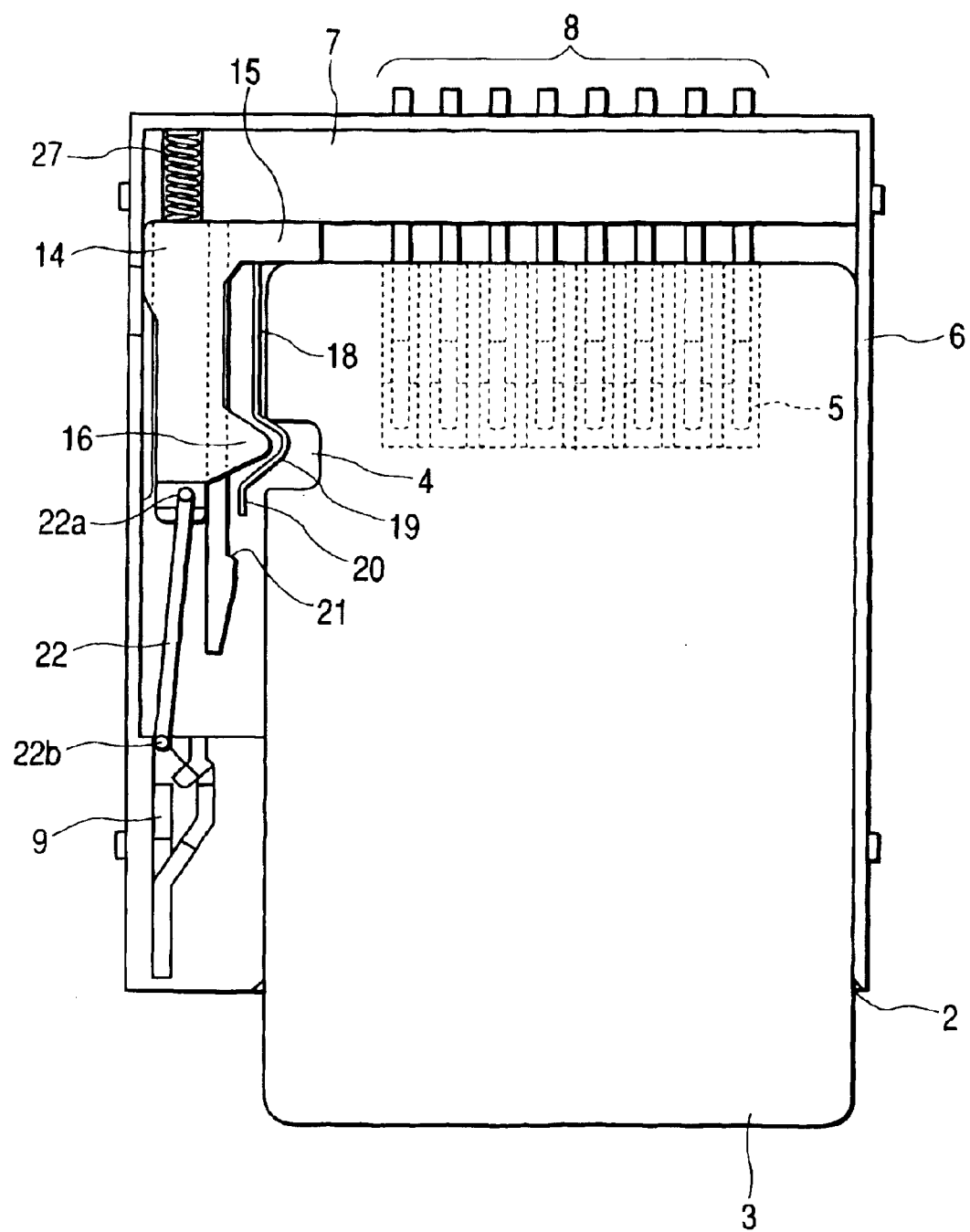
FIG. 13 is a plan view showing the compact memory card shown in FIG. 2 in an over-stroke state when ejecting the compact memory card.
Figure 14:
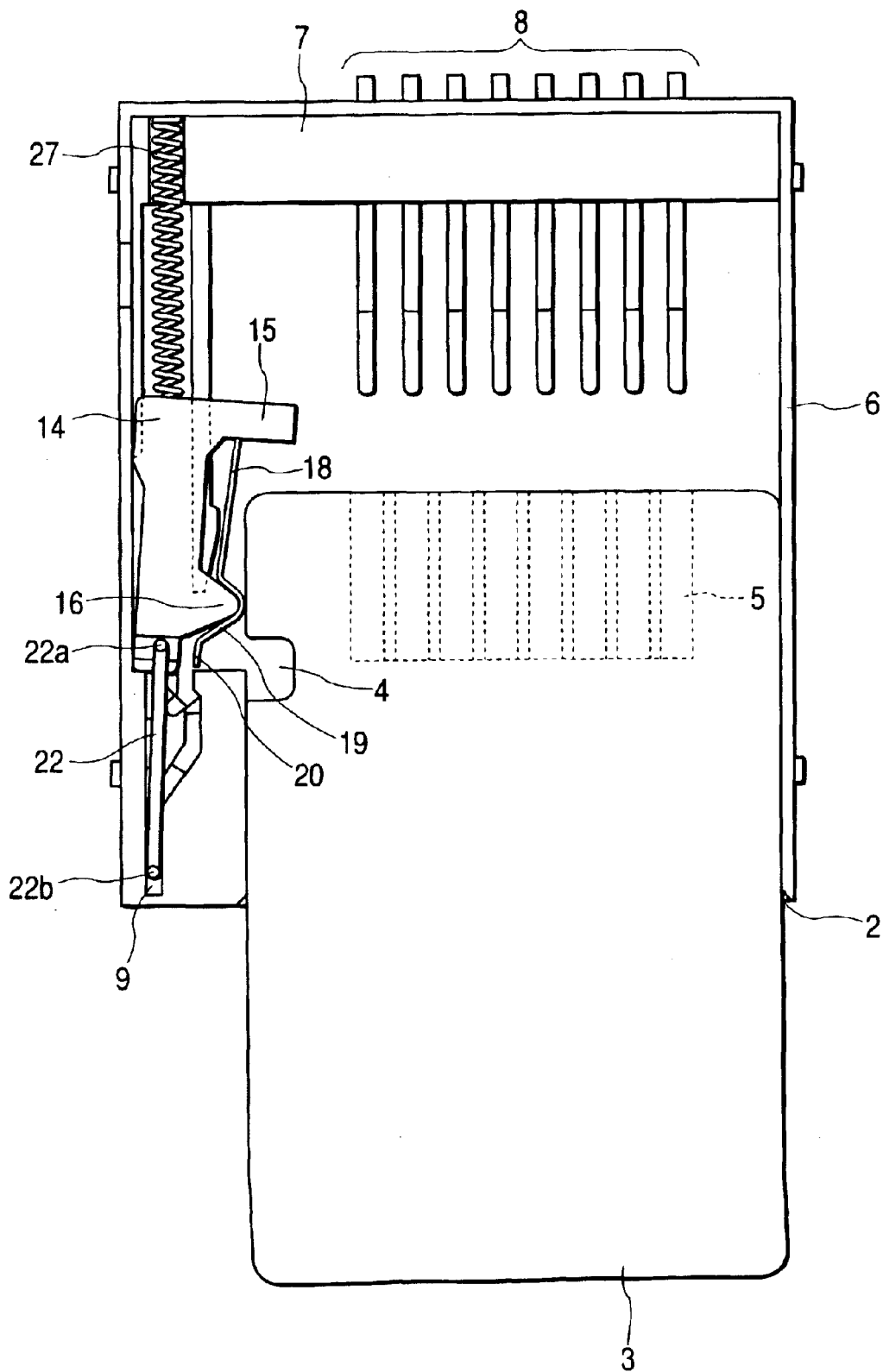
FIG. 14 is a plan view showing a state in which the compact memory card shown in FIG. 2 is at the ejected position.
Figure 15:
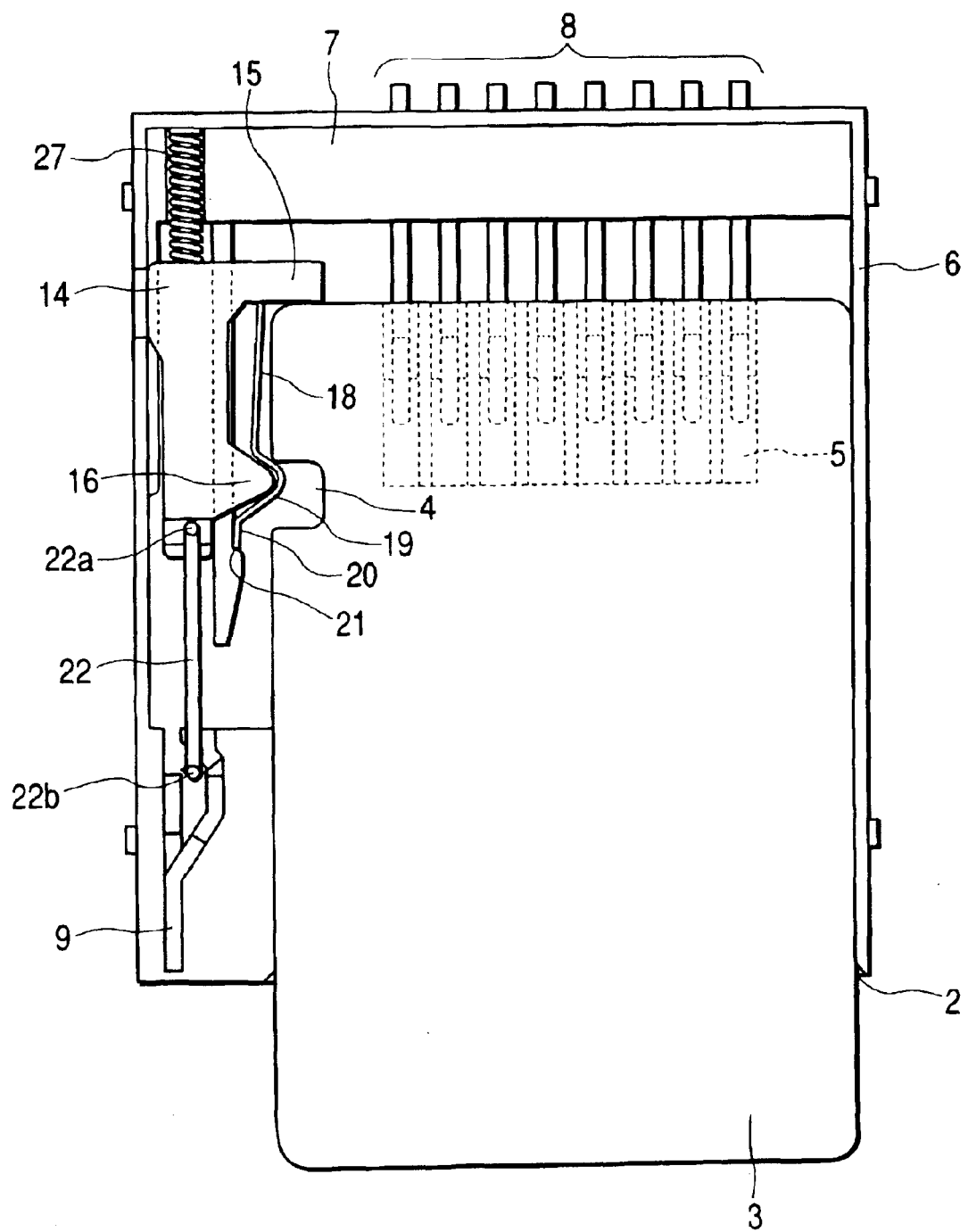
FIG. 15 is a plan view showing a state in which the compact memory card that is held at the predetermined card mounting position is forcedly pulled out.

FIG. 10 is a plan view showing the compact memory card 3 shown in FIG. 2 in a state of being inserted, and FIG. 11 is a plan view showing the compact memory card 3 of FIG. 2 in an over-stroke state before the compact memory card 3 is held at the predetermined card mounting position. FIG. 12 is a plan view showing a state in which the compact memory card 3 shown in FIG. 2 is held at the predetermined card mounting position. FIG. 13 is a plan view showing the compact memory card 3 of FIG. 2 in an over-stroke state when ejecting the compact memory card 3. FIG. 14 is a plan view showing a state in which the compact memory card 3 of FIG. 2 is at the ejected position, and FIG. 15 is a plan view showing a state in which the compact memory card that is held at the predetermined card mounting position is forcedly pulled out.

The apparatus of the present embodiment includes a unit for supporting the slider 14 so as to be capable of swinging motion in a state in which the compact memory card 3 is at the ejected position. This unit is constructed by positioning an extension of a virtual center of the longitudinal axis of an ejection spring 27 inside the first pin portion 22a of the latch-pin 22 that constitutes the locking mechanism when being ejected, as shown in FIG. 14. As a consequence, the slider 14 swings in such a manner that the overhanging portion 15 of the slider 14 moves inward when the compact memory card 3 is in the ejected position.

The action of the compact memory card 3 of the present embodiment arranged as described above in conjunction with insertion and ejection thereof will be described while referring mainly FIGS. 10 to 15.

The Initial State When the Compact Memory Card is Inserted

As shown in FIG. 10, when the compact memory card 3 is inserted through the insertion port 2 of the housing 6, the distal end thereof abuts against the overhanging portion 15 of the slider 14, and the slider 14 swings counterclockwise in FIG. 14 from a state shown in FIG. 14. Accordingly, the projecting portion 19 of the leaf spring 18 provided integrally with the slider 14 engages the recess 4 of the compact memory card 3.

In An Over-Stroke State Before Being Held at the Card Mounting Position

When the compact memory card 3 is further inserted, a pressing force is transmitted to the slider 14 via the overhanging portion 15. The slider 14 moves inward while the projecting portion 19 of the leaf spring 18 is maintained in a state of engaging the recess 4 of the compact memory card 3, and when the overhanging portion 15 abuts against the connector 7 as shown in FIG. 11, insertion of the compact memory card 3 is prevented. During this movement, the ejection spring 27 is bent by the slider 14 and the second pin portion 22b of the latch-pin 22 of the locking mechanism slides on the heart shaped cam groove 9.

The State in Which the Card is Held at a Card Mounting Position

When a pressing force that has been exerted to the compact memory card 3 is released from the state, a force of the ejection spring 27 returns the slider 14 toward the insertion port 2, and as shown in FIG. 12, the compact memory card 3 is integrally moved toward the insertion port 2 with movement of the slider 14. The second pin portion 22b of the latch-pin 22 slides along the heart-shaped cam groove 9 in association with movement of the slider 14, and the second pin portion 22b engages the locking portion included in the heart-shaped cam groove 9. Accordingly, movement of the second pin portion 22b toward the insertion port 2 is prevented against the force of the ejection spring 7, and movement of the slider 14 is prevented by the latch-pin 22, thereby holding the compact memory card 3 at the predetermined mounting position.

In this state, as shown in FIG. 3C, the contact portion 5 of the compact memory card 3 and the terminal member 8 of the connector 7 electrically communicates with each other. In this state, transmission of information to the compact memory card 3, that is, transmission of electrical signals are enabled.

The Over-Stroke State When Ejecting the Card

As shown in FIG. 12, when ejecting the compact memory card 3 held in the predetermined card mounting position, insertion of the compact memory card 3 is performed again. A pressing force exerted in this case moves the slider 14 that is in engagement with the compact memory card 3 via the overhanging portion 15 until it abuts against the connector 7, as shown in FIG. 13. During this movement, the ejection spring 27 is bent by the slider 14 again, and the second pin portion 22b of the latch-pin 22 slides along the heart-shaped cam groove 9 in a direction away from the locking portion of the heart-shaped cam groove 9 in association with the movement of the slider 14.

A State in the Ejected Position

When a pressing force that has been exerted on the compact memory card 3 is released from the state described above, a force of the ejection spring 27 moves the slider 14 and the second pin portion 22b of the latch-pin 22 along the heart-shaped cam groove 9 toward the insertion port 2. The compact memory card 3 is returned to the ejected position by movement of the slider 14 toward the insertion port 2. As a consequence, the compact memory card 3 may be removed from the insertion port 2 as shown in FIG. 14. During this movement, the second pin portion 22b of the latch-pin 22 slides along the heart-shaped cam groove 9, the extension of the virtual center of the longitudinal axis of the ejection spring 27 is positioned inside the position of the first pin portion 22a of the latch-pin 22, as described above, and the slider 14 moves clockwise from a state-shown in FIG. 13 to a state shown in FIG. 14. Accordingly, the projection 19 of the leaf spring 18 that is integrally provided with the slider 14 moves away from the recess 4 of the compact memory card 3.

Insertion of the compact memory card 3, holding the same at the predetermined mounting position, and ejection of the same are normally performed in a manner described above. However, as shown in FIG. 12, there is a case where the compact memory card 3 is forcedly pulled out in the state of being held in the predetermined mounting position.

A state in Which the Card is Forcedly Pulled In such a case, as shown in FIG. 15, when a force to pull out the compact memory card 3 is exerted, the portion positioned on the backside of the projection 19 of the leaf spring 18 is pressed by the edge that forms the recess 4 of the compact memory card 3, and the end portion 20 of the leaf spring 18 engages the shoulder 21 formed on the housing 6. At this time, the edge forming the recess 4 of the compact memory card 3 is maintained in a state of being engaged with the projection 19 of the leaf spring 18, and the projection 19 of the leaf spring 18 abuts against the abutting portion 16 of the slider 14. Therefore, the portion of the projection 19 of the leaf spring 18 and the contact portion 16 constitute a stiff structure. Therefore, a force to pull out the compact memory card 3 is transmitted to the shoulder 21 of the housing 6 from the end portion 20 of the leaf spring 18, and thus the compact memory card 3 is prevented from being pulled out. In other words, forced removal of the compact memory card 3 may be prevented.

Referring mainly to FIG. 5, operational relation between the operating member 23 and the engaging member 10 in the present embodiment will be described.

Holding of the Operating Member at the First Position

For example, in a state in which the compact memory card 3 is not inserted, as shown in FIGS. 5A and 5B, the operating member 23 is held at the second position. At this time, as shown in FIG. 5B, the second pressing portion 25 exerts a pressing force to the mounting potion 12 of the engaging member 10, and thus the projection 11 of the engaging member 10 is maintained in a state of getting away from the recess 17 of the slider 14. Therefore, movement of the slider 14 is enabled. In this state, as described above, insertion of the compact memory card 3 through the insertion port 2 is performed.

Movement of the Operating Member to the First Position

As indicated by an arrow 29 in FIG. 5B, when the compact memory card 3 that is inserted through the insertion port 2 is held at the predetermined mounting position, the operating member 23 is moved from the second position to the first position shown in FIG. 5C via the tab 26 shown in FIG. 5A and FIG. 6. Accordingly, a pressing force is exerted from the first pressing portion 24 of the operating member 23 to the mounting portion 12 of the engaging member 10, and thus the engaging member 10 swings, and consequently, the distal end 11 of the engaging member 10 engages the recess 17 of the slider 14. Therefore, the slider 14 is locked so as not to move.

Movement of the Operating Member to the Second Position

As indicated by an arrow 30 in FIG. 5C, when ejecting the compact memory card 3, the operating member 23 is moved from the first position to the second position shown in FIG. 5B via the tab 24. Accordingly, as described above, a pressing force is exerted from the second pressing portion 25 of the operating member 23 to the mounting portion 12 of the engaging member 10, and the engaging member 10 swings, and consequently, the distal end 11 of the engaging member 10 gets away from the recess 17 of the slider 14. Therefore, movement of the slider 14 is enabled, and hence the compact memory card 3 can be ejected.

In the present embodiment, as described above, forced removal of the compact memory card 3 in a state in which the compact memory card 3 is held at the predetermined card mounting position shown in FIG. 12 may be prevented. A force exerted when trying to pull the card out by force is transmitted to the housing 6, which is a member other than the slider 14, via the shoulder 21. Therefore, a force transmitted to the first pin portion 22a and the second pin portion 22b of the latch-pin 22 and the locking portion of the heart-shaped cam groove 9 through the slider 14 may be prevented, and thus the locking mechanism may be prevented from being broken or becoming damaged, thereby securing a high reliability of the apparatus.

Since the shoulder 21 may be formed integrally with the housing 6 at the time of fabrication thereof, and the leaf spring 18, which is simple in structure, is employed as an engaging member to be engaged with the shoulder 21, prevention of forced removal of the compact memory card 3 may be realized with relatively low manufacturing costs.

The abutting portion 16 is provided on the slider 14, and thus the projection 19 of the leaf spring 18 abuts against the abutting portion 16 when an attempt is made to pull out the compact memory card 3 by force and the projection 19 of the leaf spring 18 and the abutting portion 16 of the slider 14 form a stiff structure. As a consequence, permanent strain of the end portion 20 of the leaf spring 18 due to a force exerted when trying to pulling the compact memory card 3 by force may be prevented, which contributes to prevention of locking mechanisms from being broken or becoming damaged, and improves durability of the leaf spring 18.

The abutting portion 16 with which the projection 19 of the leaf spring 18 engages may be formed integrally with the slider 14 during manufacture thereof, thereby realizing relatively low manufacturing costs.

Since there is provided a unit for supporting the slider 14 so as to be capable of swinging motion in a state in which the compact memory card 3 is ejected, the projection 19 of the leaf spring 18 may be moved in a direction to get away from the recess 4 at the ejected position, and thus ordinary removal of the compact memory card 3 may be achieved smoothly. From this point of view, reliability of the apparatus may be secured.

When the compact memory card 3 is mounted to the predetermined card mounting position, movement of the slider 14 inwardly of the apparatus is constrained by the engaging member 10 held by the operating member 23 even when a strong impact is exerted, and thus the slider 14 may reliably be maintained in a locked state. From this point of view as well, reliability of the apparatus may be improved.

Since the locking mechanism of the slider 14 is constructed of the heart-shaped cam groove 9 and the latch-pin 22 as a locking member, the structure of the locking mechanism may be simplified, and stable locking function and unlocking function may be realized.

Locking and unlocking operation of the slider 14 may be realized by such simple operation as to move the operating member 23 to the first position or to the second position, thereby ensuring a superior operability.

Since the slider 14 is reliably locked and unlocked via the first pressing portion 24 and the second pressing portion 25 provided on the operating member 23, and the first pressing portion 24 and the second pressing portion 25 may be formed simultaneously with fabrication of the operating member 23, the manufacturing costs may be reduced.

Since the projection 11 is provided on the engaging member 10 and the recess 17 is provided on the slider 14, the slider 14 can reliably be locked and unlocked, the projection 11 may be formed integrally with the engaging member 10 at the time of fabrication, and the recess 17 may be formed integrally with the slider 14 at the time of fabrication From this point of view as well, the manufacturing costs may be reduced.

Although in the apparatus of the embodiment, the housing 6 includes the shoulder 21, that is, a fixed portion, with which the end portion 20 of the leaf spring 18 provided integrally with the slider 14 engages, the present invention is not limited thereto, and a construction in which a fixed portion with which the end portion 20 of the leaf spring 18 engages is provided on the cover 1 may be applied.

In such a construction, when the compact memory card 3 is forcedly pulled, the pulling force is transmitted mainly to the cover 1, and the pulling force is prevented from being transmitted to the locking mechanism via the slider 14, thereby preventing the locking mechanism from being broken or becoming damaged.

Figure 16A:
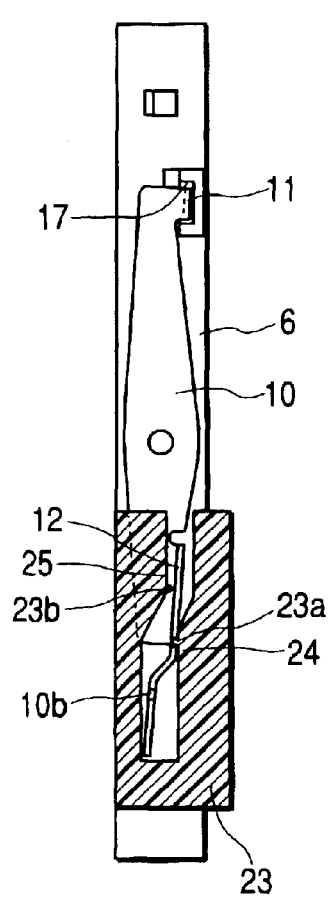
FIG. 16A is a cross sectional view showing a state in which the engaging member is moved away from the slider.
Figure 16B:
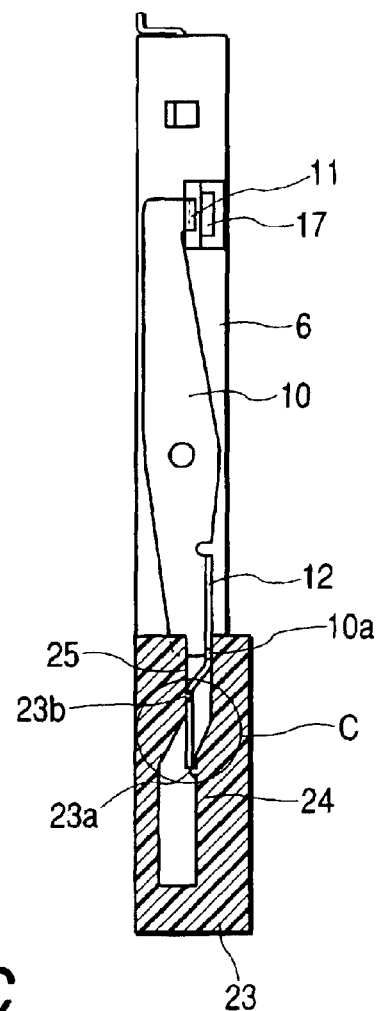
FIG. 16B is a cross sectional view showing a state in which the engaging member engages the slider, and fib. 16C is an enlarged view of the portion C in FIG. 16A.
Figure 16C:
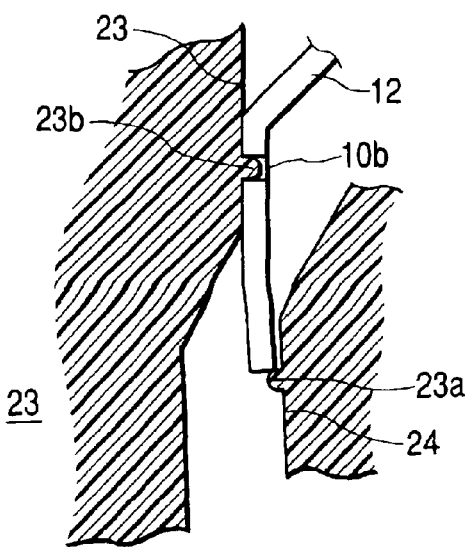
FIG. 16 shows another mounting state of the engaging member and the operating member, which constrains movement of the slider.

FIG. 16 shows another mounting state of the engaging member 10 and the operating member 23 that constrain movement of the slider 14. FIG. 16A is a cross sectional view showing a state in which the engaging member 10 is moved away from the slider 14, FIG. 16B is a cross sectional view showing a state in which the engaging member 10 engages the slider 14, and FIG. 16C is an enlarged view of the portion C in FIG. 16A.

As shown in FIGS. 16A to 16C, a construction in which a first hole 10*a* and a second hole 10*b* are formed on the mounting portion 12 of the engaging member 10, and the operating member 23 is formed with a first projection. 23*a* that may be fitted into the first hole 10*a* and a second projection 23*b* that may be fitted into the second hole 10*b*.

When the operating member 23 is at the first position as shown in FIG. 16B, the first projection 23*a* of the operating member 23 is fitted into the first hole 10*a* formed on the mounting portion 12 of the engaging member 10, whereby the operating member 23 is locked so as not to move. In other words, the first hole 10*a* of the mounting portion 12 of the engaging member 10 and the first projection 23*a* of the operating member 23 constitute a first locking unit for locking the operating member 23 at the first position shown in FIG. 16B.

As shown in FIGS. 16A and C, when the operating member 23 is at the second position, the second projection 23*b* of the operating member 23 is fitted into the second hole 10*b* formed on the mounting portion 12 of the engaging member 10, whereby the operating member 23 is locked so as not to move.

In other words, the second hole 10*b* of the mounting portion 12 of the engaging member 10 and the second projection 23*b* of the operating member 23 constitute a second locking unit for locking the operating member 23 at the second position shown in FIGS. 16A and 16C.

In this arrangement, for example, when the operating member 23 is locked at the first position shown in FIG. 16B, even when a strong impact is exerted to the apparatus, movement of the operating member 23 may be prevented, whereby the slider 14 of the projection 11 of the engaging member 10 may be prevented from getting away from the recess 17, and thus the slider 14 may further reliably be maintained in a locked state.

According to the present invention, forced removal of a card at a predetermined mounting position, and transmission of a force exerted when trying to pull the card out by force to a locking mechanism may be prevented. As a consequence, the locking mechanism may be prevented from being broken or becoming damaged, and reliability of the apparatus may be increased in comparison with those in the related art.

The engaging member may be constructed of a leaf spring having a projection that is fitted into a recess formed on the side edge of the card. In this arrangement, the manufacturing costs may be reduced by a simple construction.

The apparatus in the invention may be constructed in such a manner that an abutting portion that can abut against a projection of the leaf spring is provided, and the configuration of the abutting portion is formed into a shape corresponding to the triangular shape of projection. In this construction, stiffness may be provided on the leaf spring in the case of forced removal of the card, which contributes to prevention of the locking mechanism from being broken or becoming damaged, and to improvement of durability of the leaf spring.

The abutting portion described above may be provided on a slider. In this construction, since the abutting portion may be formed integrally with the slider at the time of fabrication, no specific member is necessary, whereby the manufacturing costs may be reduced.

The apparatus in the invention may be constructed in such a manner that the engaging member is provided on the leaf spring and the unit for supporting the slider so as to be capable of a swinging motion when the card is at the ejected position is provided as described above. In this construction, the slider may be swung in a direction to move the projection of the leaf spring away from a recess of the card at the ejected position, which enables smooth removal of the card.

The apparatus in the present invention may be constructed in such a manner that the fixed portion with which the engaging member engages is provided on a housing or on a cover. In this construction, the fixed portion may be formed integrally with the housing or the cover when manufacturing the same, which contributes to reduction of the manufacturing costs.

What is claimed is:

1. A card connector apparatus comprising:
    a slider that is movable in a direction of insertion of a card;
    an ejection spring for urging said slider in a direction of ejection of said card;
    a locking mechanism that locks said slider to a predetermined card mounting position against an urging force of said ejection spring;
    an engaging member formed on said slider to engage said card so as to hold said card at said predetermined card mounting position; and
    a fixed portion with which said engaging member engages after being displaced when an attempt is made to move said card in said direction of ejection in a state in which said card is held at said predetermined card mounting position by said engaging member,
    wherein said fixed portion is provided on a member other than said slider, engages said engaging member in said direction of ejection and in a direction substantially orthogonal to said direction of election when said card is moved in said direction of ejection and said engaging member is displaced.

2. A card connector apparatus according to claim 1, said fixed portion is provided on a housing that holds a terminal member with which a contact portion of said card comes into contact.

3. A card connector apparatus according to claim 1, characterized in that said fixed portion is formed on a cover that covers said slider.

4. A card connector apparatus according to claim 1, characterized in that said locking mechanism is provided on a heart-shaped cam groove and on said slider, and said locking mechanism comprises a locking member that is slidable along said heart-shaped cam groove.

5. A card connector apparatus according to claim 4, characterized in that said engaging member comprises a leaf spring having a projection that is fitted into a recess formed on the side edge of said card.

6. A card connector apparatus according to claim 5, characterized in that the basic configuration of said projection is a triangular shape.

7. A card connector apparatus according to claim 6, further comprising an abutting portion that can abut against said projection of said leaf spring when said leaf spring engages said fixed portion is provided, characterized in that the configuration of the abutting portion is formed into a shape corresponding to the triangular shape of said projection.

8. A card connector apparatus according to claim 7, characterized in that said abutting portion is provided on said slider.

9. A card connector apparatus according to claim 8, further including a unit for supporting said slider so as to be capable of a swinging motion in a state in which said card is ejected.

10. A card connector apparatus comprising:

a slider that is movable in a direction of insertion of a card;

an ejection spring for urging said slider in a direction of ejection of said card;

a locking mechanism that locks said slider to a predetermined card mounting position against an urging force of said ejection spring;

an engaging member formed on said slider to engage said card so as to hold said card at said predetermined card mounting position; and a fixed portion with which said engaging member engages after being displaced when an attempt is made to move said card in said direction of ejection in a state in which said card is held at said predetermined card mounting position by said engaging member, wherein said fixed portion is provided on a member other than said slider, wherein said engaging member comprises a leaf spring having a projection that basically has a triangular shape and that is fitted into a recess formed on the side edge of said card, and wherein an abutting portion is provided to abut against said projection of said leaf spring when said leaf spring engages said fixed portion, and the shape of said abutting portion corresponds to the triangular shape of said projection.

11. The card connector apparatus according to claim 10, wherein said abutting portion is provided on said slider.

12. A card connector apparatus comprising:

a slider that is movable in a direction of insertion of a card;

an ejection spring for urging said slider in a direction of ejection of said card;

a locking mechanism that locks said slider to a predetermined card mounting position against an urging force of said ejection spring;

an engaging member formed on said slider to engage said card so as to hold said card at said predetermined card mounting position; and a fixed portion with which said engaging member engages after being displaced when an attempt is made to move said card in said direction of ejection in a state in which said card is held at said predetermined card mounting position by said engaging member, said fixed portion being provided on a member other than said slider; and a unit for supporting said slider so as to be capable of a swinging motion in a state in which said card is ejected.

* * * * *